(12) United States Patent
Canapa

(10) Patent No.: US 7,513,354 B1
(45) Date of Patent: Apr. 7, 2009

(54) PORTABLE LIFT CONVEYOR

(75) Inventor: Richard A. Canapa, Humbird, WI (US)

(73) Assignee: NMC-Wollard, Inc., Eau Claire, WI (US)

( * ) Notice: Subject to any disclaimer, the term of this patent is extended or adjusted under 35 U.S.C. 154(b) by 0 days.

(21) Appl. No.: 11/462,458

(22) Filed: Aug. 4, 2006

(51) Int. Cl.
*B65G 21/10* (2006.01)

(52) U.S. Cl. .................. 198/312; 198/313; 198/315; 198/316.1

(58) Field of Classification Search .......... 198/300, 198/312, 313, 315, 316.1, 318; 414/346, 414/347, 350, 351
See application file for complete search history.

(56) References Cited

U.S. PATENT DOCUMENTS

| | | | |
|---|---|---|---|
| 2,494,302 A | 1/1950 | Mason | |
| 3,184,045 A * | 5/1965 | Fry ..................... | 198/316.1 |
| 3,543,917 A * | 12/1970 | Duerksen ............... | 198/304 |
| 4,620,629 A * | 11/1986 | Dean .................... | 198/836.1 |
| 4,663,919 A | 5/1987 | Stroh et al. | |
| 4,733,767 A | 3/1988 | Anderson et al. | |
| 5,456,348 A * | 10/1995 | Whetsel et al. ......... | 198/812 |
| 5,584,376 A | 12/1996 | Voldby | |
| 6,032,781 A | 3/2000 | Ballestrazzi et al. | |
| 6,298,981 B1 | 10/2001 | Hosch et al. | |
| 6,422,785 B1 | 7/2002 | Ruggles et al. | |
| 6,467,606 B1 | 10/2002 | Elent et al. | |
| 6,481,563 B1 | 11/2002 | Gilmore | |
| 6,655,893 B2 | 12/2003 | Kelly et al. | |
| 6,755,296 B2 | 6/2004 | Elwell | |
| 6,893,200 B2 | 5/2005 | Thogersen | |
| 7,033,125 B2 | 4/2006 | Thogersen | |
| 7,077,615 B2 | 7/2006 | Thogersen | |
| 7,156,604 B2 | 1/2007 | Thogersen | |
| 7,261,202 B1 * | 8/2007 | Canapa et al. .......... | 414/346 |
| 2003/0049107 A1 | 3/2003 | Thogersen | |

FOREIGN PATENT DOCUMENTS

WO   WO-2005/073110 A1   8/2005

OTHER PUBLICATIONS

Powerstow, Power Stow Rollertrack Conveyor—Technical data, Flexramp, Oct. 17, 2005, 3 pages, http://www.powerstow.com/rollertrack/technicaldata.html.

* cited by examiner

*Primary Examiner*—James R Bidwell
(74) *Attorney, Agent, or Firm*—Anthony J. Bourget

(57) ABSTRACT

A conveying device comprising a chassis and a conveyor bed, the bed connected to the device at a rear pivot and at a lift point, the bed engaging a forward fulcrum or pivot positioned between the rear pivot and the lift point. The bed may be pivotally connected at the forward pivot and at the rear pivot, and the rear pivot may be slidably engaged with the chassis to accommodate height change of the rear pivot. As the conveyor bed is lifted at the lift point which is preferably a pivoting lift point, the bed pivots about the forward pivot and the rear end of the bed is lowered while simultaneously pivoting at the rear pivot.

25 Claims, 8 Drawing Sheets

PORTABLE LIFT CONVEYOR

BACKGROUND OF THE INVENTION

1. Field of the Invention

The present invention relates generally to conveying devices, and more specifically to vertically adjustable portable conveyors, and particularly to portable aircraft belt loaders having a low profile.

2. Background Information

Baggage loading devices are common. A typical device includes a vehicle equipped with an endless belt upon which luggage or other items are placed. Movement of the belt conveys the luggage from one end of the vehicle to the other end. An airplane loading vehicle preferably elevates at an angle so the luggage is transported from a lower level and into higher positioned cargo area of the airplane.

One desire of such conveyors is to maintain a low elevation of the rear of the device so as to accommodate easy loading of items onto the belt. Having the rear end of the device located at an appropriate height from the ground lessens user strain, for instance, allows a user to place articles on the belt with minimal bending or lifting. Baggage handling equipment is often subject to requirements or regulations as to minimum or maximum height allowances. Equipping a vehicle with an elevating belt loader at a lower position is not always possible given the height and position of the engine or other equipment mounted to the vehicle chassis. It is also advantageous to provide the conveyor bed at a low profile so that the vehicle operator has increased visibility during transport (i.e., so the conveyor bed does not inhibit the user's view).

With some conveyors, during elevation, the rear end may tend to lower to accommodate ease of placement of articles onto the belt. However, the other end of the elevated and angled bed must reach the cargo hold areas of an aircraft. The location of such cargo areas varies from aircraft to aircraft, with some being located higher than others. Accommodating proper location of one end at the cargo hold while the other end is at an appropriate lower-end height is not easily accomplished and is impossible for some conveyor units (depending on the aircraft being serviced).

Thus, there is a need for a conveying device having an elevating bed of low profile yet capable of clearing engine and other vehicle parts, while at the same time accommodating desired rear-end and front-end elevation parameters. There is also a need for such device to be simple to use and construct. The present invention provides such a novel conveying device.

SUMMARY OF THE INVENTION

The present invention is directed toward a conveying device comprising a chassis and a conveyor bed, the bed connected to the device at a rear fulcrum or pivot and at a lift point, the bed engaging a forward fulcrum positioned between the rear pivot and the lift point. The device forward fulcrum may include a forward pivot, and the bed may be pivotally connected to the forward pivot. Preferably t rear pivot and forward pivot are slidably engaged with the chassis. Preferably the rear pivot includes a telescoping tube connected to a pivot pin.

A further aspect of the invention includes a method of conveying articles comprising providing a device comprising a chassis and a conveyor bed, the bed connected to the device at a rear pivot and at a lift point, the rear pivot defining a transport reference location, the bed engaging a forward fulcrum, and lowering the rear pivot to a position below the transport reference location. The method preferably includes the step of raising the lift point to a position above the transport reference location. The forward fulcrum may include a forward pivot with the bed pivotally connected to the forward pivot.

A further aspect of the invention includes a conveying device comprising a chassis and a conveyor bed, the bed connected to the device at a rear pivot and at a lift point, the rear pivot slidably engaged with the chassis. The chassis may be a vehicle and the rear pivot may include a telescoping tube connected to a pivot pin, the pivot pin connected to the bed.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
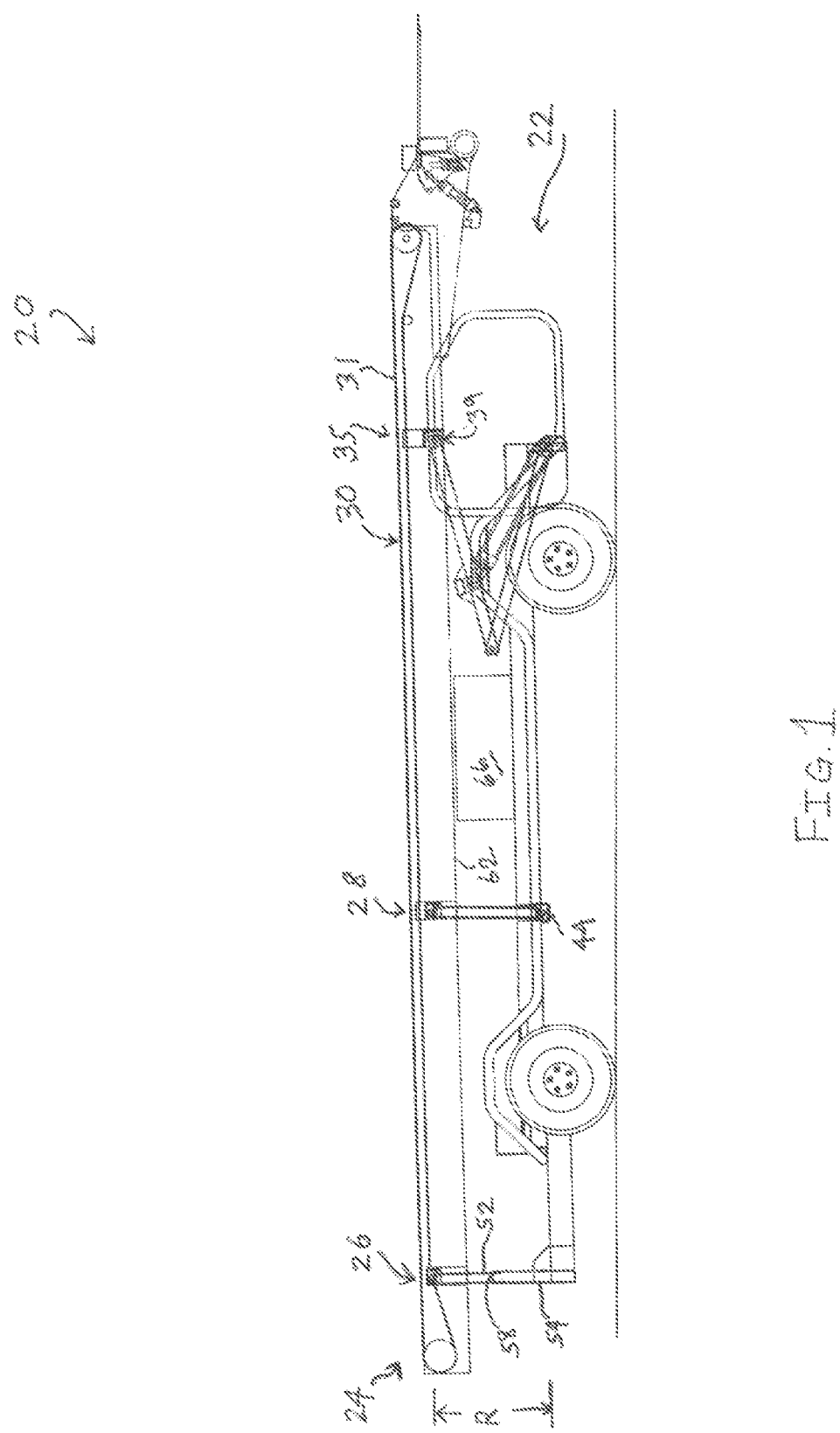
FIG. 1 is an elevation view of a conveyor made in accordance with the present invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

The invention is generally directed to a portable conveyor; and to portable conveyors comprising an inclining base having a conveyor belt, a chassis, a slidable rear pivot, a forward fulcrum and a lifting mechanism. The lifting mechanism causes the base to rotate about the fulcrum which lowers or causes the rear pivot to slide downward. The pivoting action allows for a low-profile configuration so that standard transport vehicles having engine and other parts may be equipped with conveyors that may reach a variety of cargo heights while also accommodating low rear-end positioning for ease of loading items to be conveyed.

Referring now to FIG. 1, a conveyor according to the present invention is generally depicted with reference to numeral 20. In one aspect, conveyor 20 includes a chassis 22 and a bed 24. Chassis 22 is preferably a vehicle including wheels for transport of the conveyor about a travel-way such as an airfield or loading area of an airport. Typically vehicle includes chassis 22 equipped with an engine 66 and other operating equipment such as battery units, hydraulic units, operator locations and controls, and other equipment commonly used on conveyor systems. Chassis 22 is preferably of the type common in the aircraft ground support equipment environment. Preferably bed 24 is a belt conveyor 30, and typically bed 24 includes an endless belt 31 driven by pulleys and supported by multiple conveyor belt rollers. A variety of conveyor belt devices may be used in conjunction with the present invention. While preferable, it may be appreciated that bed 24 need not be limited to a conveyor belt mechanism. Rollers, Cardin chains or other conveyance mechanisms may also be utilized on conveyor 20.

Figure 4:
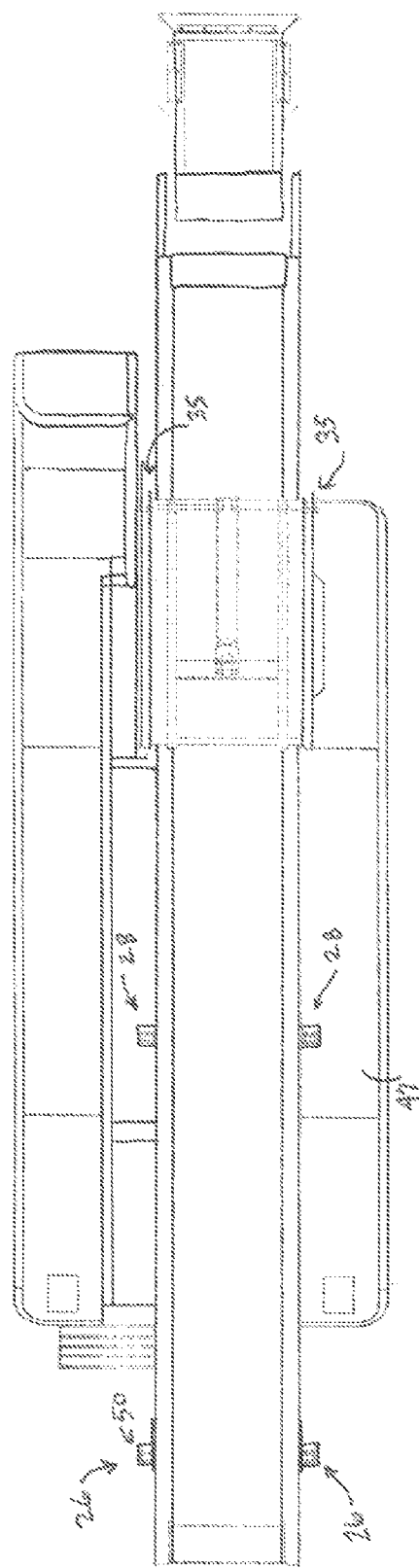
FIG. 4 is a plan view of the conveyor of FIG. 1.
Figure 8:
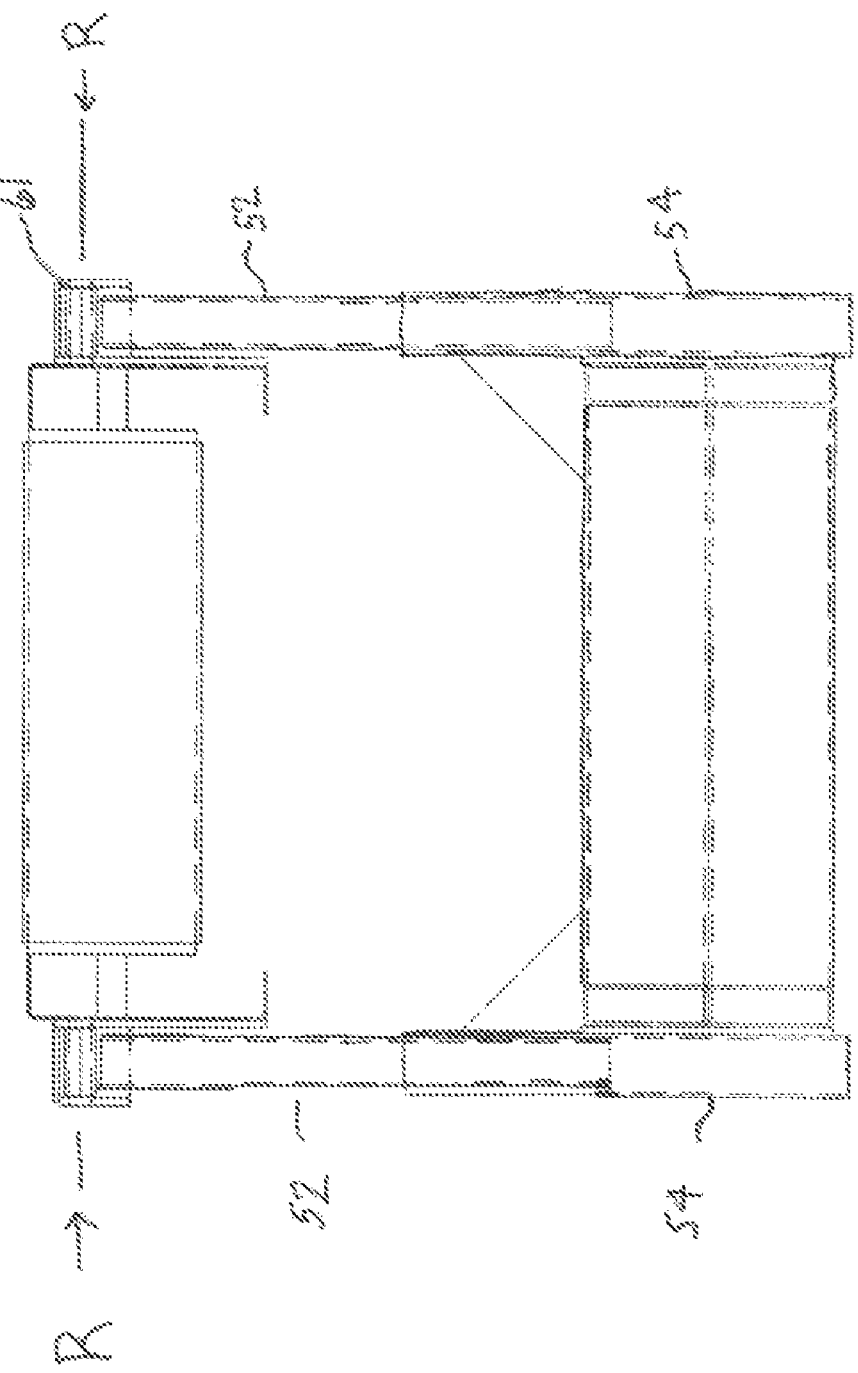
FIG. 8 is a partial rear end view of the conveyor of FIG. 1.

Bed 24 is connected to device 20 at rear fulcrum or pivot 26 and at lift point 35. Preferably pivot 26 and lift point 35 are situated on either side of bed 24 as shown in FIG. 4 and FIG. 8. Lift point 35 preferably receives raising means or lift mechanism 37 which operates to lift or raise bed 24. Lift mechanism may include any of several mechanisms such as a preferred hydraulic unit having a cylinder or ram to extend and raise/lower bed 24 to a desired height. It may be appreciated that other raising means or mechanisms 37 may be used as desired, including perhaps an electrical means. Preferably lift point 35 includes a lift point pivot 39 where mechanism 37 pivots with bed 24 as bed 24 is raised or lowered.

Rear pivot 26 is preferably slidably engaged with chassis 22. Preferably pivot 26 includes a pivot pin 68 which engages bed 24 and rear tube 52. Preferably rear tube 52 telescopes or is slidably engaged with chassis 22. As shown, rear tube 52 slidably engages with rear sleeve 54. While tube 52 inserts within sleeve 54, it may be appreciated that sleeve 54 might alternatively insert within tube 52. Tube 52 and sleeve 54 may be interchangeable. As shown, rear tube 52 and sleeve 54 are generally hollow tube structures having generally square or rectangular or round cross section. It may be appreciated that alternative structures and configurations of sliding elements may be used within the scope of the invention.

Figure 5:
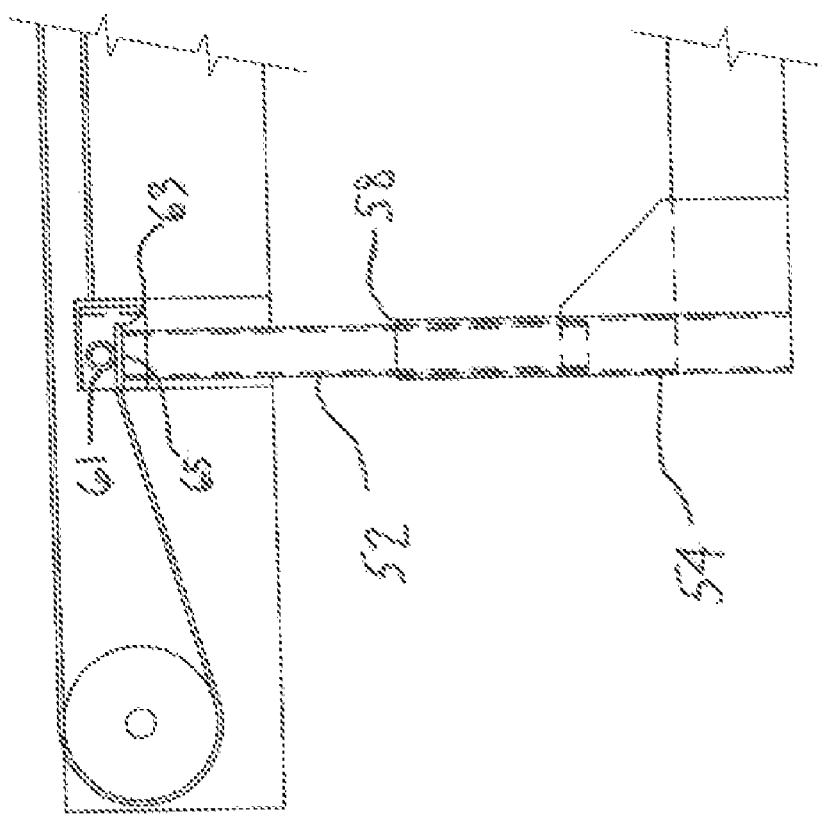
FIG. 5 is a partial transparent view of the conveyor of the present invention.
Figure 6:
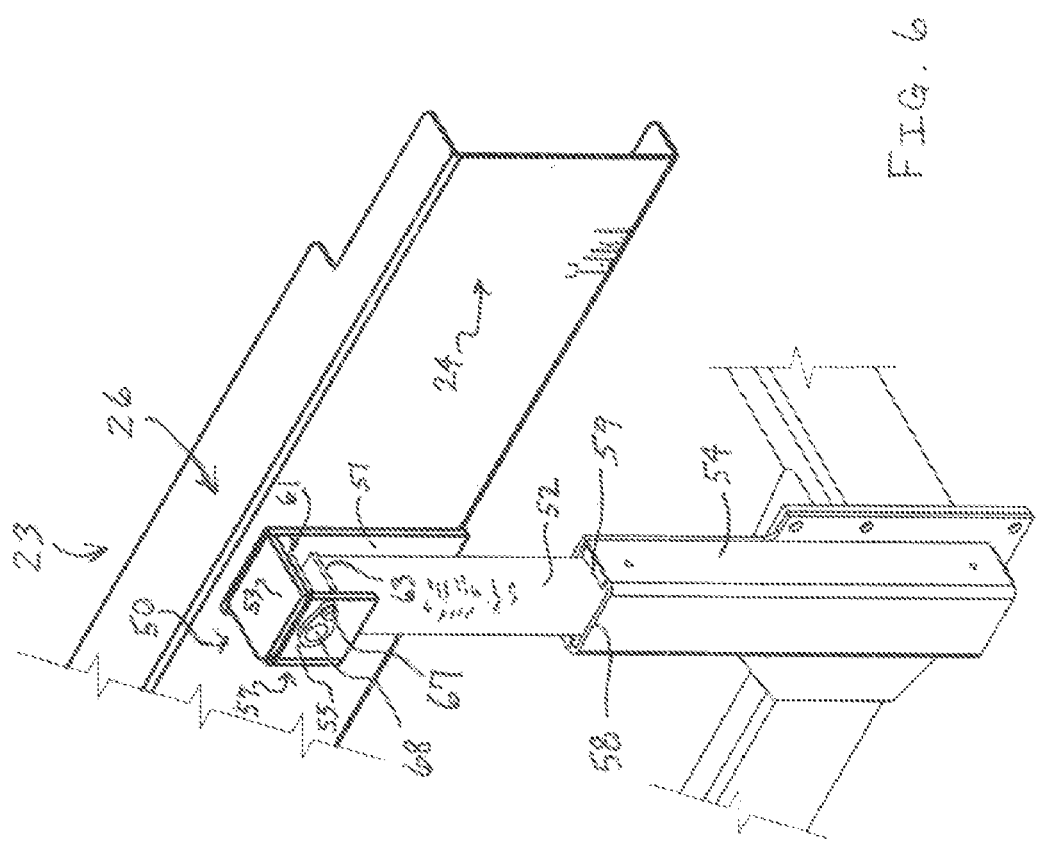
FIG. 6 is a partial perspective view of a rear aspect of the present invention.

Rear pivot 26 preferably includes a rear pivot sleeve end, or stop 58, against which the rear pivot 26 abuts during an incline mode. In one such aspect as shown in FIG. 5 and FIG. 6, tube 52 includes a tube head 61, which is preferably welded to tube 52. Tube head 61 receives pin 68 which is positioned within pivot bracket or shoulder 50. Pin 68 may be a tear drop pin having securing bolt 67 to secure pin 68 to shoulder 50. Pivot shoulder 50 is preferably a box-like structure attached to and generally extending from bed 24. Pivot shoulder 50 may include shoulder plate 51 which may be welded to bed 24. Shoulder plate 51, shoulder cap 53, shoulder end plate 55 and shoulder end cap 57 may form a generally box-like structure. Head 61 preferably inserts into the box-like structure of shoulder 50 and receives pin 68. Pin 68 may insert into shoulder plate 51 and/or bed 24 as desired. Pivot shoulder 50 accommodates positioning of pivot pin 68 about which head 61 pivots. As shown in FIG. 5, head 61 is preferably welded to tube plate 65 which includes lip 63 which projects from tube 52 and abuts against stop 58. Preferably stop 58 includes tab 59 to accommodate a greater surface area of contact or a soft contact area if desired.

Rear sleeve 54 may be fitted with a sliding surface to accommodate smooth insertion of rear tube 52. Such sliding surface (not shown) may include a polyethylene material, such as UHMW, and may be placed within sleeve 54.

Figure 2:
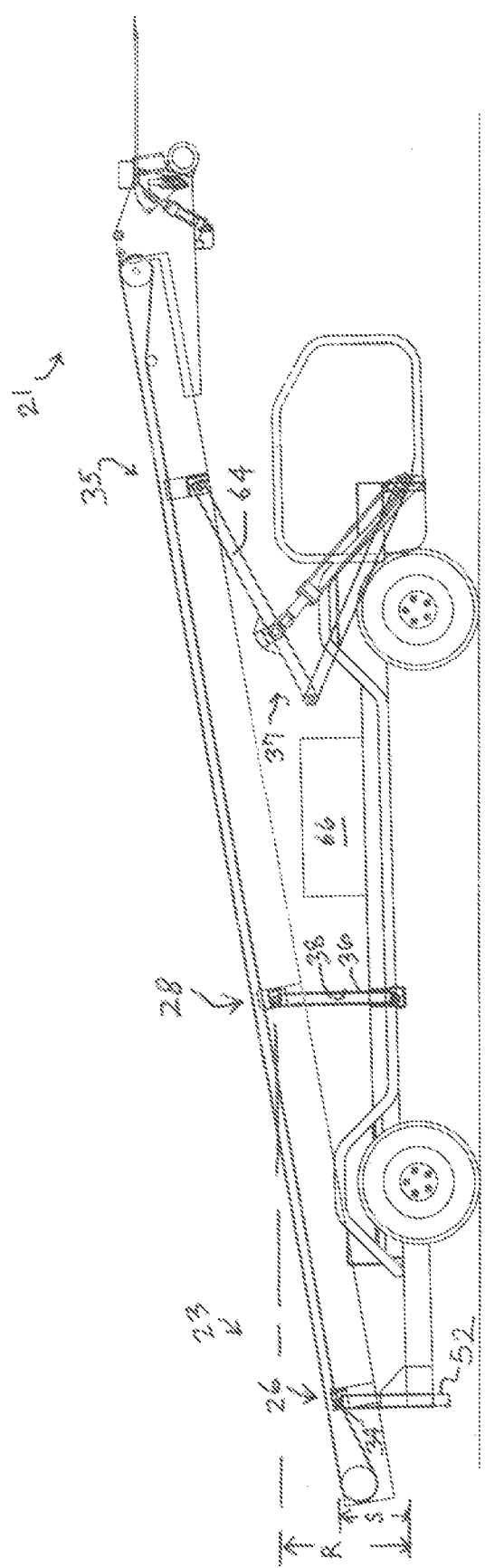
FIG. 2 is a further elevation view of the conveyor of FIG. 1.
Figure 3:
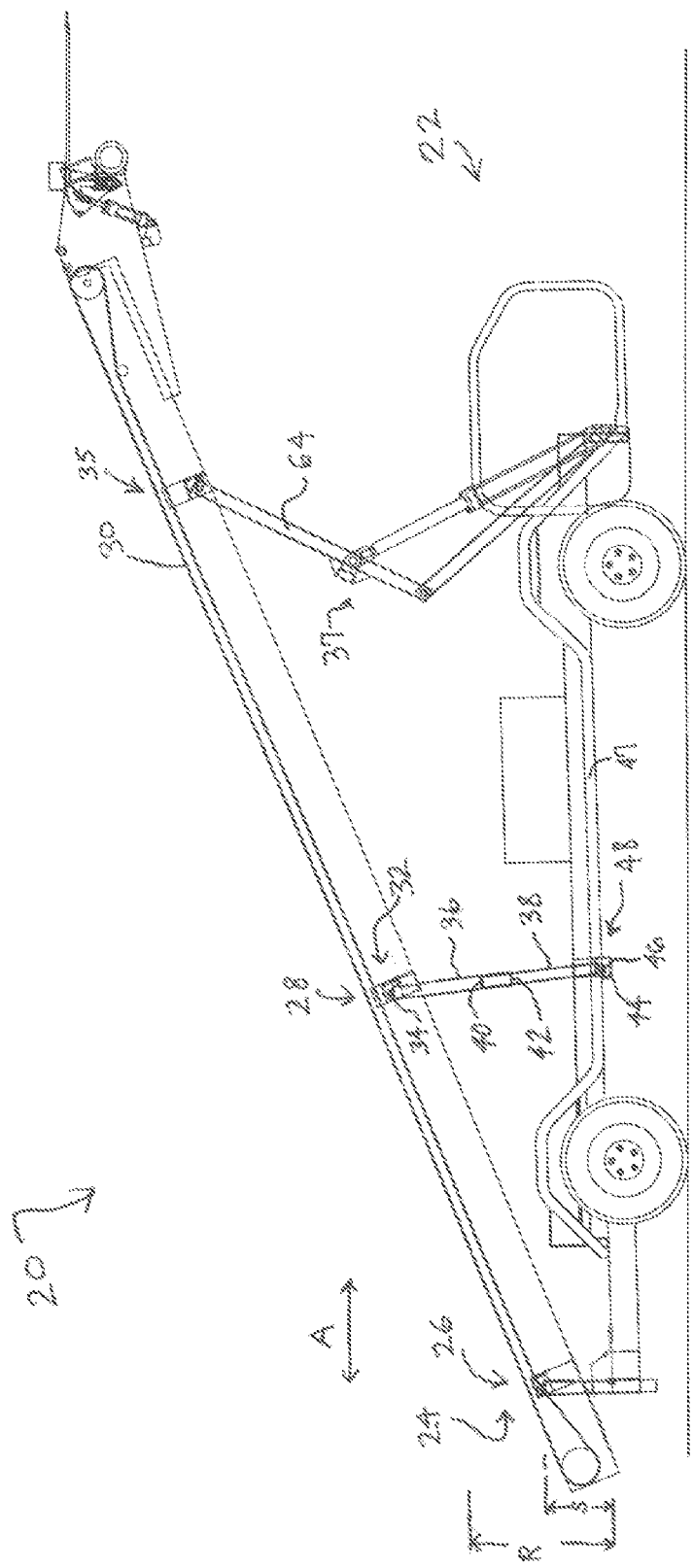
FIG. 3 is a further elevation view of the conveyor of FIG. 1.

When moving or transporting conveyor 20, bed 24 is typically in a lowered position which is generally horizontal as shown in FIG. 1. Rear pivot 26 defines a transport reference location generally depicted as arrow R. Transport reference location R is the position of rear pivot 26, relative to a point on chassis 22, when conveyor 20 is in a transport or resting mode as shown in FIG. 1. As the front end 21 of bed 24 is raised, the rear end 23 is lowered. As rear end 23 is lowered, tube 52 slides within sleeve 54 until rear pivot 26 "bottoms-out" by abutting rear sleeve end 58. As rear end 23 is lowered, bed 24 pivots about rear pivot 26 at pivot pin 68. Once rear pivot 26 bottoms-out, bed 24 continues to pivot about pin 68 so that front end 21 may be raised to a desired height to accommodate conveying of articles into a cargo area of an aircraft, for instance. It may be appreciated that pivot 26 is at a position lower than the transport reference location R. As shown in FIG. 2 and FIG. 3, rear end 23 is lowered to accommodate easier loading of articles onto bed 24.

As shown in FIG. 2 and FIG. 3, bed 24 is inclined to a position where rear pivot 26 abuts rear sleeve end 58, at which point rear pivot defines an inclined reference location S which is below transport reference location R.

Figure 7:
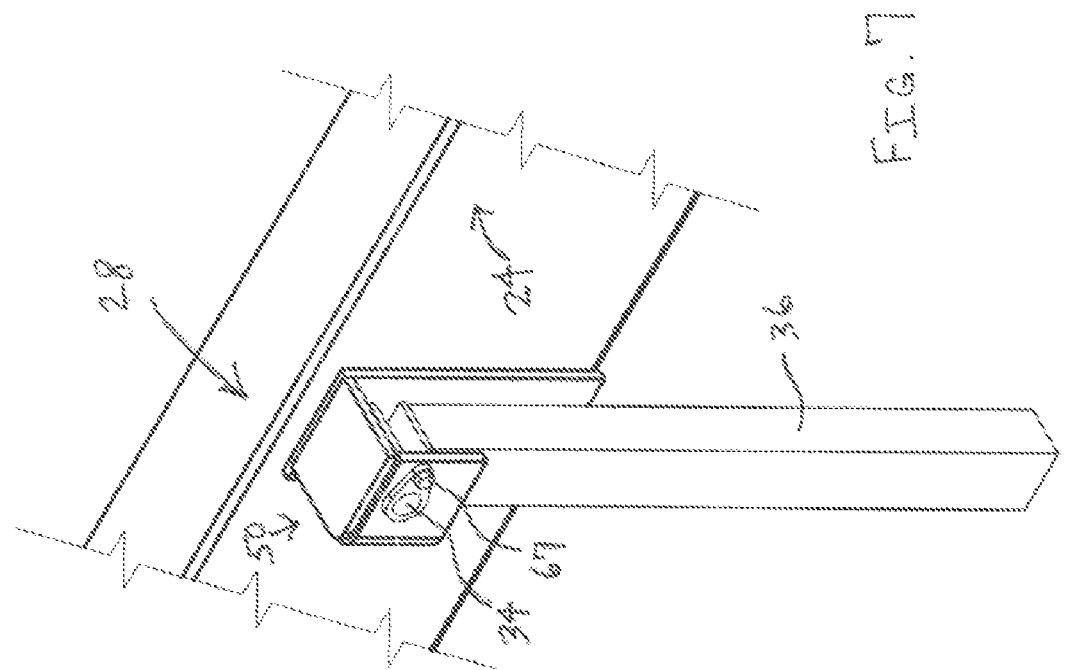
FIG. 7 is a partial perspective view of a forward fulcrum aspect of the present invention.

Conveyor 20 further includes a forward pivot or fulcrum 28. Preferably bed 24 engages forward pivot which is preferably positioned between rear pivot 26 and lift point 35. Forward pivot 28 is also preferably slidably engaged with chassis 22. As shown in FIG. 3, forward sleeve 36 cooperates with forward tube 38 so that pivot 28 slidably engages bed 24 with chassis 22. Preferably pivot 28 includes a pivot pin 34 which engages bed 24 and forward sleeve 36. Sleeve 36 pivots about pin 34 as bed 24 changes elevation. Forward tube 38 preferably inserts within sleeve 36. Preferably tube 38 engages with chassis 22 using pin 46 so that tube 38 pivots with respect to chassis 22 at a third pivot 48. As shown in FIG. 7, forward pivot may also include pivot shoulder 50 and associated head 61 as generally described above with respect to rear pivot 26.

In a transport mode where bed 24 is positioned in a relatively horizontal fashion, forward sleeve end 42 of sleeve 36 may abut frame rail 47 of chassis 22. In such configuration forward sleeve 36 operates to support bed 24 and inhibits bed 24 from contacting engine 66 or other elements of chassis 22. Alternatively, sleeve 36 may abut forward tube base 44 which also holds forward tube pin 46. Alternatively, forward tube end 40 of tube 38 may abut forward pivot 28. In any case, pivot 28 is restricted from downward motion while in a transport or relatively horizontal state. Sleeve 36 "bottoms out" and operates as a fulcrum about which bed 24 pivots. Alternatively, forward pivot 28 "bottoms out" by contacting forward tube end 40. In such case, forward tube end 40 may be equipped with a rubber pad (not shown) to absorb forces as may be appreciated. It may be appreciated that chassis 22 may be equipped with alternative forward pivots 28, or forward fulcrum, positioned between rear pivot 26 and lift point 35, including stationary structures about which bed 24 may pivot.

In a lifting operation, lift mechanism 37 operates to raise front end 21 of bed 24. As shown in FIG. 2, such lifting of front end 21 causes bed 24 to pivot about fulcrum or forward pivot 28 which simultaneously results in rear end 23 lowering from reference point R to reference point S. Bed 24 also pivots at rear pivot 26 during such lifting operation. Use of forward pivot 28 allows for lifting of bed 24 without having bed 24 contact engine 66 or other elements of chassis 22. Thus, such arrangement allows for a low-profile positioning of bed 24 without inhibiting function while simultaneously providing sufficient clearance from other parts of the conveyor or chassis. Once rear pivot 26 bottoms-out, front end 21 may continue to be lifted in which case forward pivot 28 slides upward. Preferably forward pivot 28 continues to allow bed 24 to pivot during such extending operation. To accommodate a lifting action, third pivot 48 allows forward tube to pivot to automatically adjust to a preferred angle to facilitate smooth telescoping action of sleeve 36. As shown in FIG. 3, as bed 24 lifts higher, forward sleeve 36 extends upward and slides about forward tube 38. As bed 24 lowers, sleeve 36 slides downward upon tube 38 to assist guidance of bed back to a resting position upon chassis 22. It may be appreciated that rear pivot 26 inhibits bed 24 from shifting or sliding in a fore or aft direction represented generally by arrow A.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A method of conveying articles comprising:
    providing a device comprising:
        a chassis; and
        a conveyor bed, said bed connected to said device at a rear pivot and at a lift point, said rear pivot defining a transport reference location, a portion of said bed located between said rear pivot and said lift point, said portion of said bed engaging a forward fulcrum; and
    lowering said rear pivot to a position below said transport reference location.

2. The method of claim 1 further comprising the step of raising said lift point to a position above said transport reference location.

3. The method of claim 1 wherein said device includes a raising mechanism connected to said bed at said lift point.

4. The method of claim 1 wherein said forward fulcrum includes a forward pivot, said bed pivotally connected to said forward pivot.

5. The method of claim 1 wherein said rear pivot is slidably engaged with said chassis.

6. The method of claim 1 wherein said forward fulcrum is slidably connected to said chassis.

7. The method of claim 6 further comprising the step of raising said forward fulcrum to a position above said transport reference location.

8. The method of claim 1 wherein said forward fulcrum is positioned between said rear pivot and said lift point.

9. A conveying device comprising:
    a chassis; and
    a conveyor bed, said bed connected to said device at a rear pivot and at a lift point, a portion of said bed located between said rear pivot and said lift point, said portion of said bed engaging a forward fulcrum; and
    where said rear pivot is slidably engaged with said chassis.

10. The device of claim 9 wherein said forward fulcrum includes a forward pivot, said bed pivotally connected to said forward pivot.

11. The device of claim 9 wherein said rear pivot includes a telescoping tube connected to a pivot pin.

12. The device of claim 9 wherein said device includes a rear pivot stop against which said rear pivot abuts in an incline mode.

13. The device of claim 12 wherein said stop includes a sleeve.

14. The conveying device of claim 9 wherein said forward fulcrum is located generally between front and rear wheels of said chassis.

15. The conveying device of claim 9 wherein said forward fulcrum and said rear pivot are slidably engaged with said chassis.

16. The conveying device of claim 9 further comprising a raising means for raising an end of said conveyor bed, said forward fulcrum located between said rear pivot and said raising means.

17. A conveying device comprising:
    a chassis; and
    a conveyor bed, said bed connected to said device at a rear pivot and at a lift point, said rear pivot slidably engaged with said chassis, said rear pivot including a telescoping tube slidably engaged with a rigidly mounted sleeve;
    where said rigidly mounted sleeve maintains one and only one angle with respect to said chassis.

18. The conveying device of claim 17 where said sleeve is substantially vertically rigidly mounted to said chassis.

19. A conveying device comprising:
    a chassis; and
    a conveyor bed, said bed connected to said device at a rear pivot and at a lift point said rear pivot slidably engaged with said chassis, said rear pivot including a telescoping tube slidably engaged with a rigidly mounted sleeve, and
    where said sleeve is substantially vertically rigidly mounted to said chassis.

20. The method of claim 1 where said portion of said bed includes a pivot shoulder.

21. The method of claim 1 where said forward fulcrum includes a pivot pin connected to said bed.

22. The method of claim 1 where said forward fulcrum includes a forward tube connected to said chassis.

23. The method of claim 1 where said forward fulcrum includes a sleeve.

24. The device of claim 9 where said forward fulcrum includes a forward tube connected to said chassis.

25. A conveying device comprising:
    a chassis; and
    a conveyor bed, said bed connected to said device at a rear pivot and at a lift point, a portion of said bed located between said rear pivot and said lift point, said portion of said bed engaging a forward fulcrum, and
    where said chassis is a vehicle capable of transporting said conveying device, wherein said conveyor bed includes a belt conveyor, and wherein said forward fulcrum includes a forward pivot which includes a sleeve pivotally connected to said bed and a tube pivotally connected to said chassis.

* * * * *